United States Patent
Cortes et al.

(10) Patent No.: US 10,481,736 B2
(45) Date of Patent: Nov. 19, 2019

(54) OBJECT DETECTION AND MOTION IDENTIFICATION USING ELECTROMAGNETIC RADIATION

(71) Applicant: Samsung Electronics Company, Ltd., Suwon, Gyeong gi-Do (KR)

(72) Inventors: Juan Pablo Forero Cortes, Sunnyvale, CA (US); Santiago Ortega Avila, Sunnyvale, CA (US); Sajid Sadi, Mountain View, CA (US)

(73) Assignee: Samsung Electronics Company, Ltd., Suwon (KR)

( * ) Notice: Subject to any disclaimer, the term of this patent is extended or adjusted under 35 U.S.C. 154(b) by 0 days.

(21) Appl. No.: 15/885,497

(22) Filed: Jan. 31, 2018

(65) Prior Publication Data

US 2018/0373391 A1    Dec. 27, 2018

Related U.S. Application Data

(60) Provisional application No. 62/523,153, filed on Jun. 21, 2017.

(51) Int. Cl.
| | |
|---|---|
| *G06F 3/042* | (2006.01) |
| *G06F 3/0488* | (2013.01) |
| *G06F 3/046* | (2006.01) |
| *G06F 3/01* | (2006.01) |

(52) U.S. Cl.
CPC ............ *G06F 3/0421* (2013.01); *G06F 3/017* (2013.01); *G06F 3/046* (2013.01); *G06F 3/04883* (2013.01)

(58) Field of Classification Search
CPC ............ G06F 2203/04108; G06F 2203/04101
See application file for complete search history.

(56) References Cited

U.S. PATENT DOCUMENTS

| | | | |
|---|---|---|---|
| 9,304,594 B2 | 4/2016 | Finocchio | |
| 9,652,047 B2 | 5/2017 | Mullins | |
| 9,674,436 B2 | 6/2017 | Crane | |
| 2010/0045962 A1* | 2/2010 | Keam | G06F 3/0425 356/3 |

(Continued)

FOREIGN PATENT DOCUMENTS

| | | |
|---|---|---|
| EP | 2738647 A1 | 6/2014 |

OTHER PUBLICATIONS

International Search Report for International Application No. PCT/KR2018/005768, dated Sep. 5, 2018.

(Continued)

*Primary Examiner* — Koosha Sharifi-Tafreshi
(74) *Attorney, Agent, or Firm* — Baker Botts L.L.P.

(57) ABSTRACT

In one embodiment, one or more systems may include multiple emitters and receivers of electromagnetic radiation. Each emitter and each receiver may correspond to a different field of view respectively. The one or more systems may activate at least some of the emitters according to an illumination pattern. One or more receivers may then detect at least part of the electromagnetic radiation that is reflected from an object. The one or more systems may further detect a presence of the object or a motion of the object in the field of view of at least one of the receivers based at least on the illumination pattern and on electromagnetic radiation detected by the one or more receivers.

20 Claims, 12 Drawing Sheets

(56) References Cited

U.S. PATENT DOCUMENTS

| | | |
|---|---|---|
| 2014/0027606 A1* | 1/2014 | Raynor ................. G06F 3/0421 |
| | | 250/205 |
| 2014/0035812 A1 | 2/2014 | Skurnik |
| 2014/0376773 A1 | 12/2014 | Holz |
| 2015/0035800 A1* | 2/2015 | Uchiyama ............. G06F 3/0421 |
| | | 345/175 |
| 2015/0062087 A1* | 3/2015 | Cho .................... G02F 1/13338 |
| | | 345/175 |
| 2015/0069249 A1 | 3/2015 | Alameh |
| 2015/0261299 A1 | 9/2015 | Wajs |
| 2015/0364113 A1 | 12/2015 | Ahn |
| 2016/0140912 A1 | 5/2016 | Im |
| 2016/0187974 A1 | 6/2016 | Mallinson |
| 2016/0341959 A1 | 11/2016 | Gibbs |
| 2017/0269699 A1* | 9/2017 | Withanage Don ...... G06F 3/043 |

OTHER PUBLICATIONS

Written Opinion for International Application No. PCT/KR2018/005768, dated Sep. 5, 2018.

* cited by examiner

OBJECT DETECTION AND MOTION IDENTIFICATION USING ELECTROMAGNETIC RADIATION

RELATED APPLICATION

This application claims the benefit, under 35 U.S.C. § 119(e), of U.S. Provisional Patent Application No. 62/523,153 filed 21 Jun. 2017, which is incorporated herein by reference.

TECHNICAL FIELD

This disclosure generally relates to electronic detection of an object.

BACKGROUND

Smart devices and electronic systems may monitor health, daily routines, activities, habits, preferences, etc. of a user. The monitoring may be achieved through the interactions with smart devices and electronic systems. Such interactions may be touchless for a variety of considerations such as hygiene, security, convenience, increased functionality, etc. As a result, in-the-air hand interactions without touching any controllers may be desired to enable effective interactions between human and smart devices and electronic systems. In-the-air hand interactions may have a variety of advantages including providing larger interaction space between a user and a device or system, more freedom for a user during the interaction, eliminating hygiene issues as no touch is needed, convenience, privacy protection, intuitiveness, etc. In-the-air interactions may require effective detection and localization of objects, motion tracking of objects, and motion identification of objects. Existing solutions for the aforementioned tasks mainly use different combinations of sensors including ultrasound, laser, magnetic field, cameras, non-focused light receivers, and RADAR. However, these solutions are relatively expensive, demand many computational and processing resources, and have relatively poor energy efficiency.

DESCRIPTION OF EXAMPLE EMBODIMENTS

Particular embodiments of the touchless sensing system described herein may allow a user to interact with a touchless sensing system using in-the-air hand interactions. To achieve such a goal, the touchless sensing system may use electromagnetic radiation (e.g., near infrared light) to sense in-the-air hand interactions by tracking hand movement and detecting gestures performed in a three dimensional (3D) interaction space at a low cost and low computational load. In particular embodiments, the touchless sensing system may use one or more infrared LEDs (light-emitting diodes) and one or more photodiodes to sense in-the-air hand interactions. As a result, the acquired data corresponding to the interactions may be more compact and easier to process, which is more economical. In some embodiments, the frames of the data may contain only a few bytes in length, which may allow for the usage of a combined solution of efficient computational techniques to reconstruct and process the data. In some embodiments, the touchless sensing system may use a set of algorithms executed by a microcontroller with a single core and a set of sensors to analyze the data and obtain accurate detection of in-the-air interactions.

Particular embodiments of the touchless sensing system described herein may have a relatively high sensing resolution, particularly when compared to the relatively minimal processing and energy requirements. Particular embodiments of the touchless sensing system may take a small and adaptable form so it can be embedded wherever necessary according to the requirements of applications. Particular embodiments of the touchless sensing system may include efficient algorithms to process data acquired by sensors in real time with minimum computational cost, which may enable in-the-air interactions to be applied to a broader range of devices and systems. Although this disclosure describes and illustrates particular touchless sensing systems for detecting, tracking, and identifying in-the-air objects and motions, this disclosure contemplates any suitable touchless sensing systems for detecting, tracking, and identifying in-the-air objects and motions in any suitable manner.

Figure 1:
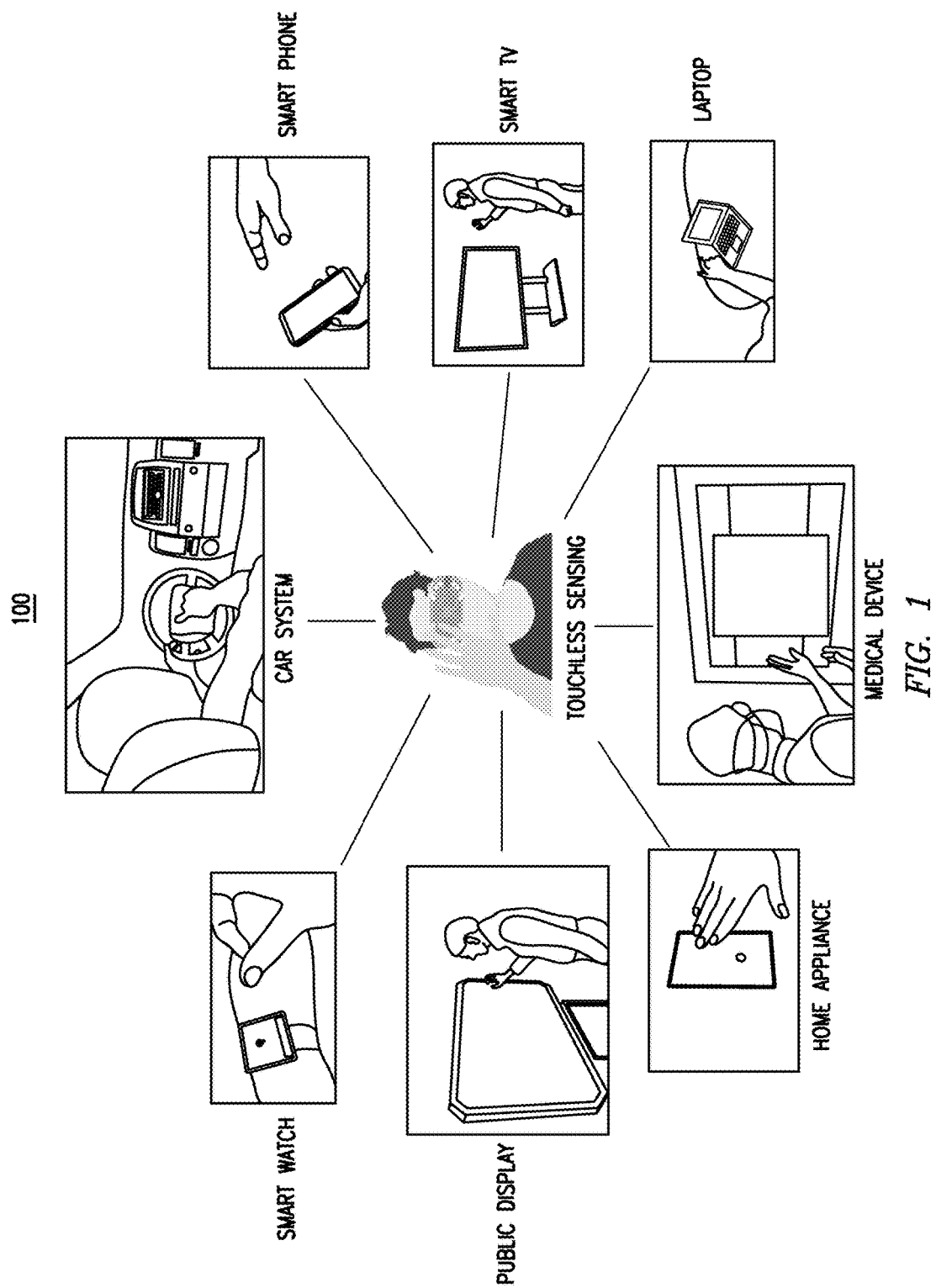
FIG. 1 illustrates an example scenario of touchless sensing in a plurality of use cases.

FIG. 1 illustrates an example touchless sensing system in a variety of use cases. As an example and not by way of limitation, a touchless sensing system may detect that an object (e.g., hand) is in its field of view, such as a field of view of one or more of the LEDs or photodiodes of the touchless sensing system. As another example and not by way of limitation, the touchless sensing system may further use stochastic (probabilistic) methods for estimating whether a detected object is present and/or moving. The touchless sensing system may additionally use one or more algorithms for identifying the motion of the detected object (e.g., hand gesture). As a result, in-the-air interactions from users may be detected and identified, which may be further used as commands for different applications (e.g., a punching command for a VR boxing game). A touchless sensing system may include a plurality of sensing modules based on a plurality of components that have simple structures, low cost, and low power consumption. For example, these components may include LEDs and photodiodes. Using simple, cheap and power-efficient components and stochastic methods may enable a touchless sensing system to have one or more advantages. One advantage may include saving power with respect to both battery and computation. Another advantage may include having no requirement for calculating time of flight of a projectile of an object. Another advantage may include having no requirement of cameras as a plurality sensing modules are used, with each sensing module corresponding to one pixel. Another advantage may include having no requirement for machine-learning algorithms to detect, track and identify in-the-air objects and motions. Instead, a touchless sensing system may use relatively simple mathematical calculations. Particular embodiments of the touchless sensing system described herein may also be small, adaptable, cheap and computationally efficient. A touchless sensing system may be integrated with a plurality of devices and systems for a plurality of use cases. For example, as illustrated in FIG. 1, a touchless sensing system may be integrated with a smart watch, car system, smart phone, public display, laptop, medical device, home appliance, and/or smart TV. Although this disclosure illustrates a particular scenario involving in-the-air interaction with a touchless sensing system and a plurality of particular use cases, this disclosure contemplates any suitable scenario involving in-the-air interaction(s) with any suitable touchless sensing systems and any suitable use cases in any suitable manner.

Figure 2:
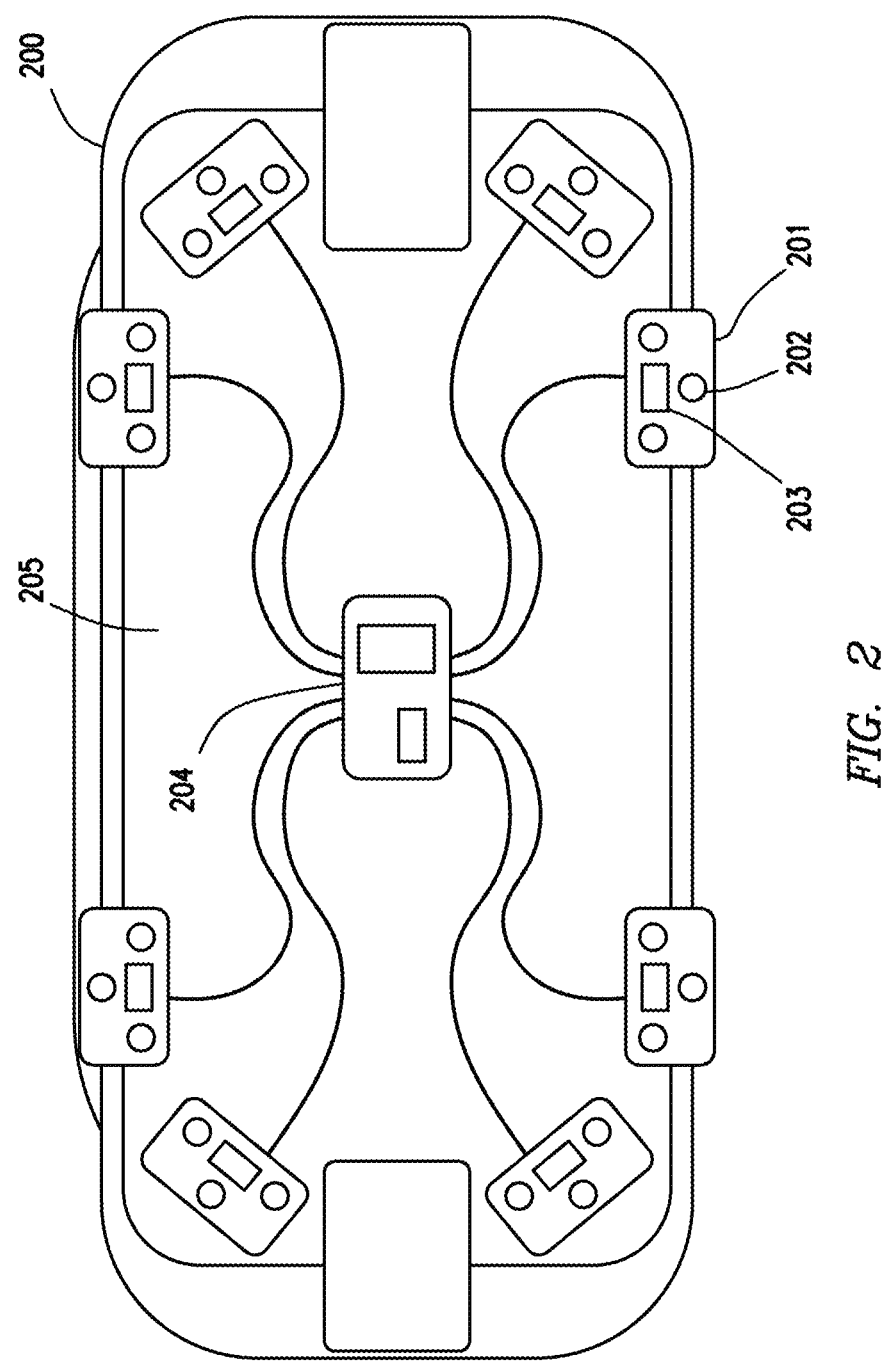
FIG. 2 illustrates an example prototype of a touchless sensing system.

FIG. 2 illustrates an example prototype of a touchless sensing system 200. In particular embodiments, the touchless sensing system 200 may include a plurality of emitters 202 of electromagnetic radiation. As an example and not by way of limitation, the electromagnetic radiation may include near infrared (NIR) light. Each emitter 202 may include one or more light-emitting diodes (LEDs) and may correspond to a different field of view. For instance, each emitter 202 can be directed or pointed toward a different field of view. In particular embodiments, the touchless sensing system 200 may also include a plurality of receivers 203 of electromagnetic radiation. Each receiver 203 may include one or more photodiodes and may correspond to a different field of view. In particular embodiments, the touchless sensing system 200 may also include one or more non-transitory storage media embodying instructions. In particular embodiments, the touchless sensing system 200 may additionally include one or more processors. The one or more processors may be operable to execute the instructions to activate at least some of the emitters 202 according to an illumination pattern. The one or more processors may be operable to execute the instructions to also detect a presence of an object or a motion of the object in a corresponding field of view of at least one of the receivers 203, based at least on the illumination pattern and on electromagnetic radiation received or detected by one or more receivers 203.

In particular embodiments, the touchless sensing system 200 may include a plurality of sensing modules 201. Each of the plurality of sensing modules 201 may include one or more emitters 202 of the plurality of emitters 202 of electromagnetic radiation. Each emitter 202 in the same sensing module 201 may have the same field of view or a different field of view. Each of the plurality of sensing modules 201 may also include one or more receivers 203 of the plurality of receivers 203 of electromagnetic radiation. Each of the plurality of sensing modules 201 may additionally include one or more microcontrollers. In particular embodiments, the one or more microcontrollers of each of the plurality of sensing modules 201 may be configured to communicate with the control board 205. The one or more microcontrollers of each of the plurality of sensing modules 201 may be configured to also modulate the electromagnetic radiation emitted by the one or more emitters 202 of the corresponding sensing module 201. The one or more microcontrollers of each of the plurality of sensing modules 201 may be configured to additionally regulate emission power of the one or more emitters 202 of the corresponding sensing module 201. The one or more microcontrollers of each of the plurality of sensing modules 201 may be configured to further process the electromagnetic radiation received by the one or more receivers 203 of the corresponding sensing module 201. While this disclosure describes various aspects of sensors, receivers, and microcontrollers within a sensing module, this disclosure contemplates that those components may by implemented in a touchless sensing system separately from a sensing module, that a sensing module may include only some of those components, and/or that a sensing module may include additional components of the touchless sensing system.

Figure 3:
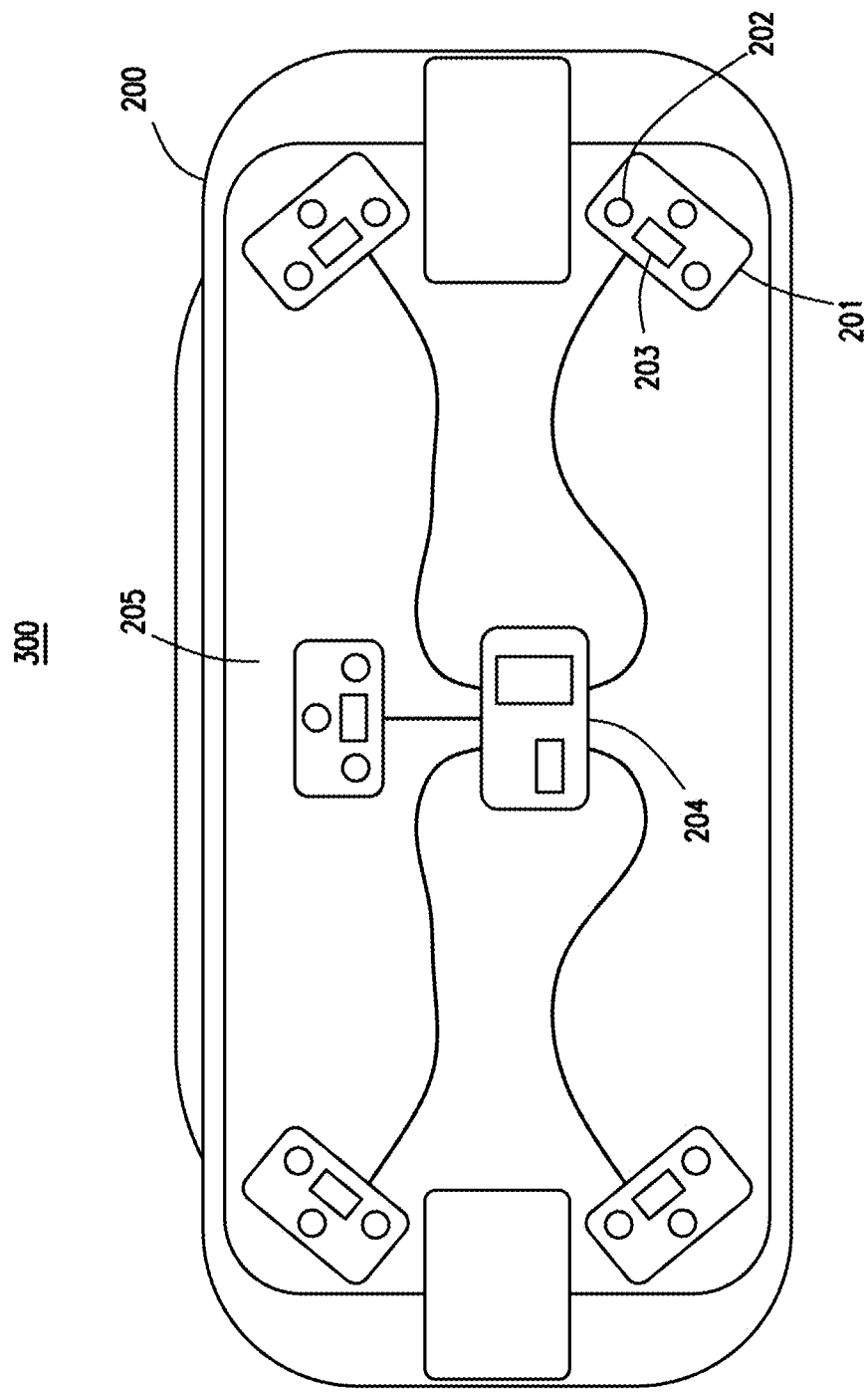
FIG. 3 illustrates another example prototype of a touchless sensing system.

In particular embodiments, the touchless sensing system 200 may also include one or more control modules 204. The touchless sensing system 200 may be a modular design, which may allow for different physical distributions of sensing modules 201 and different numbers of sensing modules 201 in the touchless sensing system 200. The modular design may also allow for better scalability of the touchless sensing system 200. As an example and not by way of limitation, the touchless sensing system 200 may include eight sensing modules 201, one control module 204, and one control board 205 across the surface of the touchless sensing system 200, as illustrated in FIG. 2. The control module 204 may be located at the center of the control board 205. Four of the eight sensing modules 201 may be located at the corners of the control board 205 and be angled outward to a specified, preset, or predetermined degree. The remaining four sensing modules 201 may be located at the edges of the control board 205 and be forward-facing. Although this disclosure illustrates a particular prototype of the touchless sensing system, this disclosure contemplates any suitable prototype of the touchless sensing system in any suitable manner. As an example and not by way of limitation, FIG. 3 illustrates another example prototype of the touchless sensing system 200. The touchless sensing system 200 may include five sensing modules 201, one control module 204 and one control board 205. Four sensing modules 201 may be located at the corners of the control board 205 and the remaining one may be located at the center of the control board 205.

In particular embodiments, the touchless sensing system 200 may prioritize the plurality of sensing modules 201 differently based on different tasks. As an example and not by way of limitation, the sensing modules at the edges of a touchless sensing system, such as sensing modules 201 at the corners of the control board 205, may be prioritized over other sensing modules 201 if the touchless sensing system 200 is identifying a motion of an object (e.g., hand gesture). As another example and not by way of limitation, each of the plurality of sensing modules 201 may have the same priority if the touchless sensing system 200 is determining a position of an object. As another example and not by way of limitation, the touchless sensing system 200 may prioritize the plurality of sensing modules 201 using both the aforementioned strategies if the touchless sensing system 200 is tracking a motion of an object. In particular embodiments, the touchless sensing system 200 may activate the emitters in the plurality of sensing modules 201 with different patterns (e.g., illumination patterns). As an example and not by way of limitation, the touchless sensing system 200 may activate the emitters in the plurality of sensing modules 201 of the example prototype in FIG. 2 sequentially. To be more specific, in some embodiments, the touchless sensing system 200 may activate the emitters in one sensing module 201 at a time (e.g., at the same time) and activate all receivers of all sensing modules after activating the emitters in the one sensing module. When the emitters of one sensing module 201 are activated, the other sensing modules 201 remain inactive. The touchless sensing system 200 may proceed to activate the emitters in other sensing modules 201 in this way until all the sensing modules 201 have been activated. As another example and not by way of limitation, the touchless sensing system 200 may activate emitters in the plurality of sensing modules 201 of the example prototype in FIG. 3 in the following way. The touchless sensing system 200 may first activate the emitters in the sensing modules 201 at the corners of the control board 205, and then activate the emitters in the sensing module 201 at the center of the control board 205. The touchless sensing system 200 may also then activate the emitters of all the sensing modules 201 sequentially as illustrated in the previous example. As this example illustrates, a touchless sensing system may implement a plurality of different illumination patterns in sequence. Although this disclosure illustrates particular ways to activate the emitters of various sensing modules, this disclosure contemplates any suitable way to activate the sensing modules in any suitable manner.

In particular embodiments, the touchless sensing system 200 may be configured with particular parameters with respect to different components. As an example and not by way of limitation, the distance between two of the plurality of sensing modules 201 may be a particular value. For example, the distance may be 2 cm or less. As another example and not by way of limitation, the height of the isolation walls of the plurality of sensing modules 201 may be a particular value. For example, the height may be 4 mm. As another example and not by way of limitation, the material of the isolation walls of the plurality of sensing modules 201 may be a particular type of material. For example, the material may be photopolymer resin RS-F2-GPBK-04. As another example and not by way of limitation, the power used by the emitters of the plurality of sensing modules 201 may be at a particular level. For example, each sensing module 201 may emit electromagnetic radiation at 2.6 mW in bursts of 1200 vs. Each sensing module 201 may be active for approximately 100 ms within one second. The example prototype of the touchless sensing system 200 as illustrated in FIG. 2 may have eight sensing modules 201. As a result, all the eight sensing modules 201 may consume approximately 2 mW per second. As another example and not by way of limitation, the field of view of the receivers of the plurality of sensing modules 201 may be of particular extent. For example, the field of view may be 150 degrees (i.e., −75°~+75° relative to direction normal to the sensor). If an emitter is placed at an angle that is less than −75°, the receiver may receive half or less than half of the power of that emitter). Although this disclosure illustrates particular parameters of the touchless sensing system, this disclosure contemplates any suitable parameters of the touchless sensing system in any suitable manner.

In particular embodiments, the touchless sensing system 200 may modulate emitted NIR light at 57.6 KHz and send it in short bursts to reduce environmental noise such as sunlight or fluorescent indoor light. In particular embodiments, the photodiode of a receiver 203 may have a wavelength sensitivity peak at 940 nm, a band pass filter and an automatic gain control module. In particular embodiments, the receivers 203 may detect the envelope of the NIR light and dynamically adjust the gain to compensate for different ambiance light. In particular embodiments, the touchless sensing system 200 may fully control the emission power of each of the emitters 202 of each sensing module 201 through the corresponding microcontroller using digital potentiometers. As a result, the touchless sensing system 200 may precisely manage the total energy radiated by each sensing module 201. In particular embodiments, the control board 205 may include a microcontroller, a power management section and a Bluetooth transceiver. The control board 205 may synchronize up to all the sensing modules 201. In particular embodiments, the control board 205 may provide a stable power source for the touchless sensing system 200, coordinate all the sensing modules 201, cluster all the raw data samples collected from the receivers 203, and effectively handle communication, such as Bluetooth communication, with an entity that processes and models raw data samples from the receivers 203.

The physical distribution of sensing modules 201 may have a direct impact on the spatial resolution in a 2D space measured by X and Y axes, and on the field of view of the touchless sensing system 200. As an example and not by way of limitation, the physical distribution of sensing modules 201 illustrated in FIG. 2 may support a spatial resolution of two centimeters along the X and Y axes and a resolution of fifty centimeters depth range along the Z axis. Furthermore, the touchless sensing system 200 may adjust the emission power of the emitters 202, which may enable the touchless sensing system to determine a depth of an object. For example, the receivers 203 may perceive less reflected NIR light from objects located at a greater distance. Although this disclosure illustrates a particular working mechanism of the touchless sensing system, this disclosure contemplates any suitable working mechanism of the touchless sensing system in any suitable manner.

Figure 4:
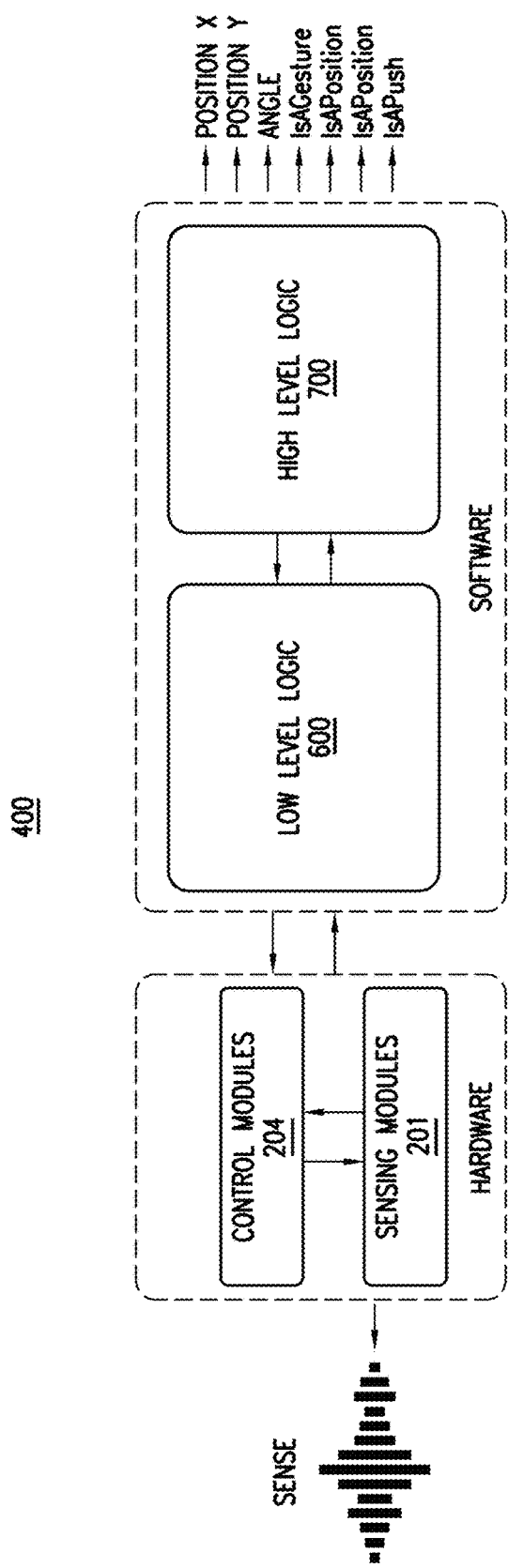
FIG. 4 illustrates an example structure of a touchless sensing system detecting an object and identifying a motion.

FIG. 4 illustrates an example structure of the touchless sensing system 200 detecting an object and/or identifying a motion. In particular embodiments, the touchless sensing system 200 may include both hardware and software. The hardware may include one or more control modules 204 and a plurality of sensing modules 201. The hardware may sense NIR light emitted by one or more emitters. The software may include a Low Level Logic 600 and a High Level Logic 700. The Low Level Logic 600 may control the hardware including both the control modules 204 and the sensing modules 201. The Low Level Logic 600 may generate a plurality of illumination patterns, modulate and control the emission power of the emitters 202, acquire raw data samples from the plurality of receivers 203 and construct a raw data frame based on the acquired raw data samples. The High Level Logic 700 may reconstruct the raw data frame, interpret it and process it for a plurality of tasks. The tasks may include determining the presence of an object, determining the position of an object with respect to the X and Y axes (e.g., a plane parallel to a plane in which the emitters are distributed), determining the angle of a motion of the object, and identifying the motion of the object on the X-Y plane (e.g., a hand gesture) and along the Z axis (e.g., a push action). Although this disclosure illustrates a particular structure of the touchless sensing system, this disclosure contemplates any suitable structure of the touchless sensing system in any suitable manner.

Figure 5:
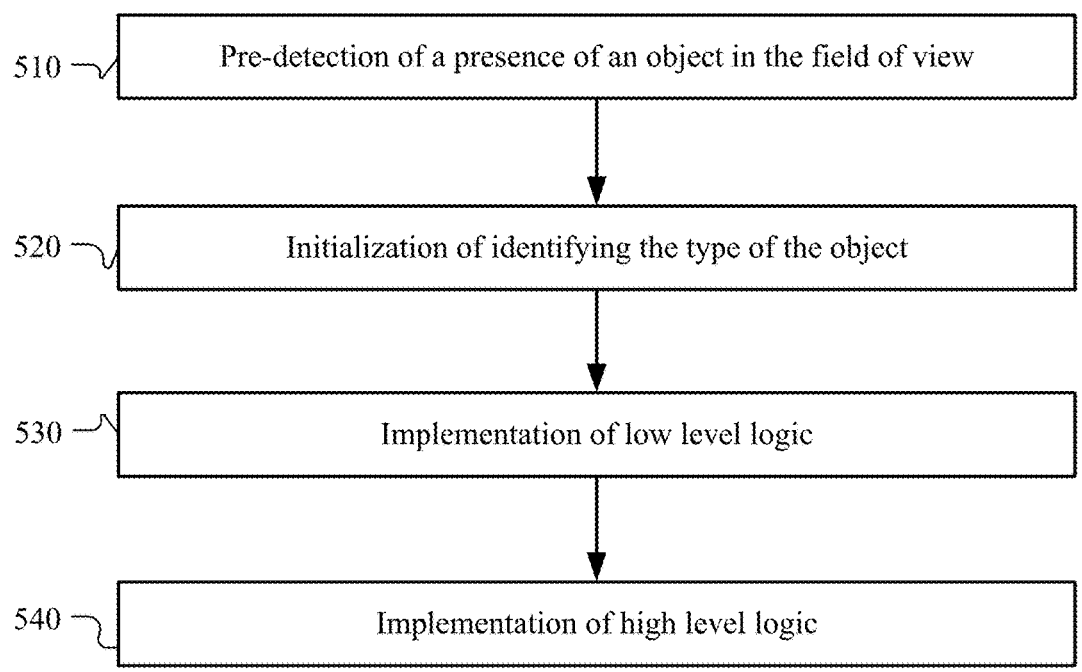
FIG. 5 illustrates an example back-end flow diagram of a touchless sensing system.

FIG. 5 illustrates an example back-end flow diagram of the touchless sensing system 200. In particular embodiments, the touchless sensing system 200 may start with step 500. At step 500, the touchless sensing system 200 may perform a pre-detection of a presence of an object in the field of view. As an example and not by way of limitation, one sensing module 201 of the touchless sensing system 200 may emit NIR light at a predetermined interval, such as every second, to detect the presence of an object and start low-level processing. Based on the pre-detection result, the touchless sensing system 200 may determine whether to implement one or more subsequent steps. In particular embodiments, the one or more subsequent steps may include implementing a Low Level Logic 600 and implementing a High Level Logic 700. At step 510, the touchless sensing system 200 may perform an initialization to identify the type of the object detected at step 500. As an example and not by way of limitation, the type of the object may include a hand, glove, or metal. The touchless sensing system 200 may further adjust the power level of the emitters 202 with respect to the NIR light based on the type of the object. At step 530, the touchless sensing system 200 may implement the Low Level Logic 600. At step 540, the touchless sensing system 200 may implement the High Level Logic 700. Although this disclosure illustrates a particular back-end flow diagram of the touchless sensing system, this disclosure contemplates any suitable back-end flow diagram of the touchless sensing system in any suitable manner.

Figure 6:
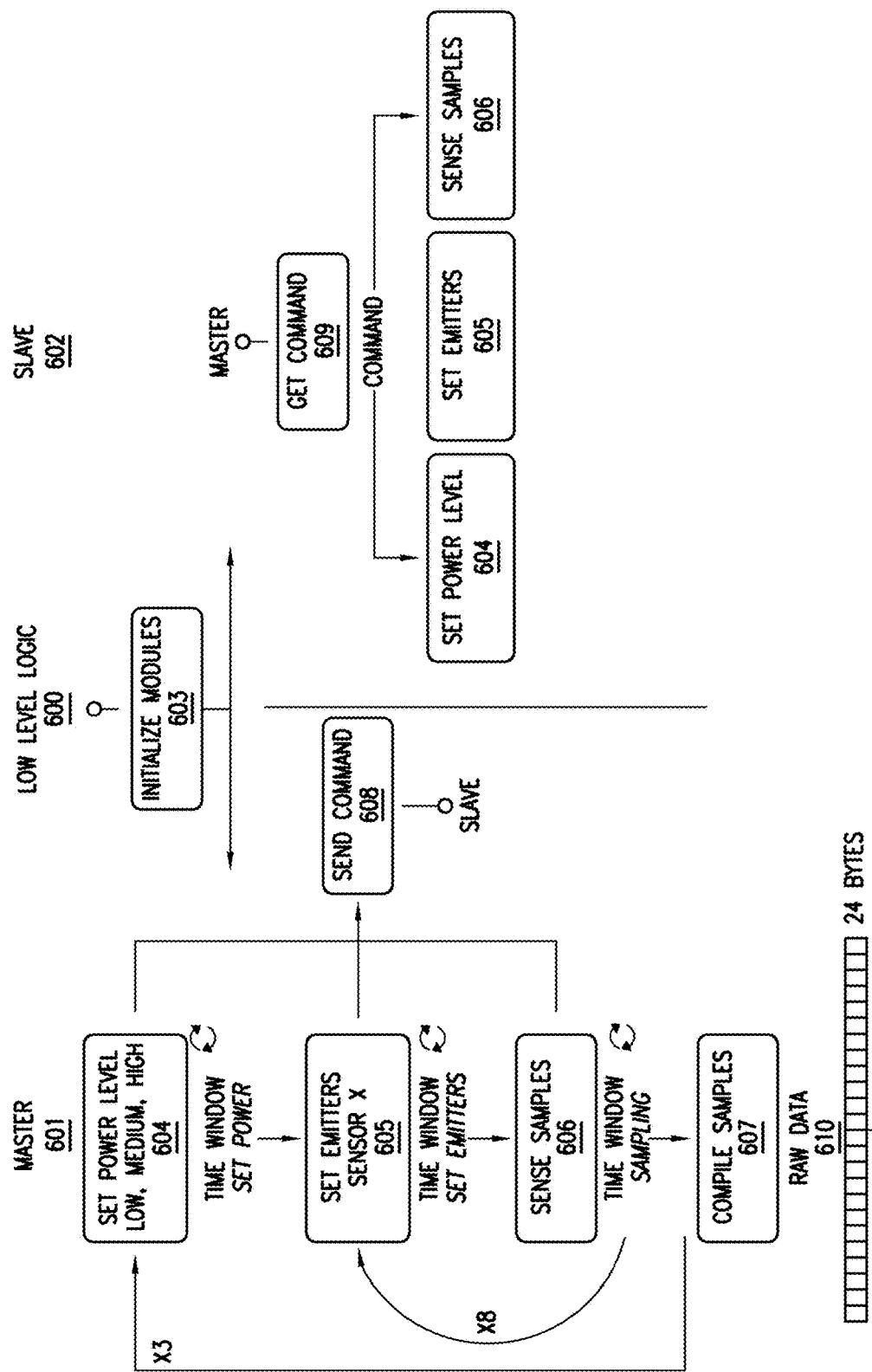
FIG. 6 illustrates an example functional diagram of the operation of a Low Level Logic.

FIG. 6 illustrates an example functional diagram of the operation of the Low Level Logic 600 corresponding to the example prototype of the touchless sensing system 200 illustrated in FIG. 2. In particular embodiments, the Low Level Logic 600 may control the hardware of the touchless sensing system 200. The hardware may include both the control modules 204 and the sensing modules 201. The Low Level Logic 600 in FIG. 6 may include a Master logic 601 and a Slave logic 602 running in different microprocessors. In particular embodiments, the Low Level Logic 600 may be embedded in a single microcontroller unit (MCU). In particular embodiments, the Low Level Logic 600 may include a customized serial communication protocol. As a result, the communication time between all the modules of the Low Level Logic 600 may be less than a threshold amount of time. In particular embodiments, the Low Level Logic 600 may additionally include an extra channel for byte detection and synchronization of a raw data vector, and a fixed set of broadcast commands. Although this disclosure illustrates a particular functional diagram of the operation of the Low Level Logic, this disclosure contemplates any suitable functional diagram of the operation of the Low Level Logic in any suitable manner.

In particular embodiments, the Low Level Logic 600 may first initialize different modules at step 603. In particular embodiments, the Low Level Logic 600 may generate a plurality of illumination patterns. Based on one or more of the plurality of illumination patterns, the Master logic 601 may determine, for the plurality of emitters 202 of electromagnetic radiation, a power level selected from a plurality of pre-defined power levels at step 604. The Master logic 601 may send a corresponding command at step 608 to the Slave logic 602. The Slave logic 602 may receive such a command at step 609 and run the command. The Master logic 601 may further instruct the plurality of emitters 202 of electromagnetic radiation to emit electromagnetic radiation at the selected power level at step 605. Similarly, the Master logic 601 may send a corresponding command at step 608 to the Slave logic 602. The Slave logic 602 may receive the command at step 609 and run the command. As an example and not by way of limitation, the pre-defined power levels may include Low Energy, Medium Energy, and High Energy. Each power level may determine a distinct phase. In each phase, the Low Level Logic 600 may control the plurality of emitters 202 and the plurality of receivers 203 in the following way. In particular embodiments, the Low Level Logic 600 may sequentially activate the one or more emitters 202 of each of the plurality of sensing modules 201 to emit electromagnetic radiation at the determined power level, such that the emitters 202 of only one sensing module 201 are active at a time. After any of the one or more emitters 202 of any sensing module 201 are activated, the touchless sensing system 200 may proceed to step 606 of sensing raw data samples. The Master logic 601 may also send a corresponding command at step 608 to the Slave logic 602. The Slave logic 602 may receive the command at step 609 and run the command. At step 606, the touchless sensing system 200 may receive, at one or more of the plurality of receivers 203, reflected electromagnetic radiation corresponding to the determined power level each time after the one or more emitters 202 are activated for each of the plurality of sensing modules 201. The one or more of the plurality of receivers 203 may be selected based on whether the reflected electromagnetic radiation reaches the one or more of the plurality of receivers 203.

The touchless sensing system 200 may sequentially activate the one or more emitters 202 of the plurality of sensing modules 201, sense the raw data samples, and repeat the process until all the sensing modules 201 have been activated. For example, the process may be repeated eight times if the touchless sensing system 200 includes eight sensing modules 201, as illustrated in FIG. 2. After all the emitters 202 have been activated, the Low Level Logic 600 may determine another power level and start another phase accordingly. The Low Level Logic 600 may continue the cycle of determining a power level, activating emitters 202 and receiving reflected electromagnetic radiation at receivers 203 until all the pre-determined power levels have been selected. For example, the cycle may be repeated three times corresponding to the three power levels, as illustrated in FIG. 6. In particular embodiments, the cycle may be repeated continuously at a 30 Hz rate. The Master logic 601 may collect the raw data samples received from the receivers 203. The Master logic 601 may then compile the raw data samples at step 607. The Master logic 601 may further provide the compiled raw data samples as a raw data vector 610 to the High Level Logic 700. In particular embodiments, the Low Level Logic 600 may generate the raw data vector including a plurality of bytes. Each of the plurality bytes is based on received electromagnetic radiation corresponding to each of the plurality of pre-defined power levels with respect to each of the plurality sensing modules 201. For example, as illustrated in FIG. 6, the Low Level Logic may output raw data of 24 bytes, with each byte representing the power of the electromagnetic radiation received by a sensing module at one of the power levels. In particular embodiments, when a sensing module includes a plurality of receivers, a byte may represent the average power of the electromagnetic radiation received by the receivers of that sensing module. Although this disclosure illustrates particular ways of sensing data samples based on particular illumination patterns, this disclosure contemplates any suitable way of sensing data samples based on any suitable illumination patterns in any suitable manner.

In particular embodiments, the Low Level Logic 600 may activate the plurality of emitters 202 using a different illumination pattern than that described above. As an example and not by way of limitation, the Low Level Logic 600 may activate the plurality of emitters 202 of the example prototype of the touchless sensing system 200 illustrated in FIG. 3 as follows. The Low Level Logic 600 may first activate the one or more emitters 202 of each of the plurality of sensing modules 201 at the corners of the control board 205 to emit electromagnetic radiation at the determined power level, such that the emitters 202 of all the sensing modules 201 at the corners are active at the same time. The Low Level Logic 600 may then activate the one or more emitters 202 of the sensing module 201 at the center of the control board 205 to emit electromagnetic radiation at the determined power level. The Low Level Logic 600 may further sequentially activate the one or more emitters 202 of each of the plurality of sensing modules 201 to emit electromagnetic radiation at the determined power level, such that the emitters 202 of only one sensing module 201 are active at a time. Although this disclosure illustrates particular ways of activating emitters for a particular prototype of the touchless sensing system, this disclosure contemplates any suitable ways of activating emitters for any suitable prototype of the touchless sensing system in any suitable manner.

Figure 7:
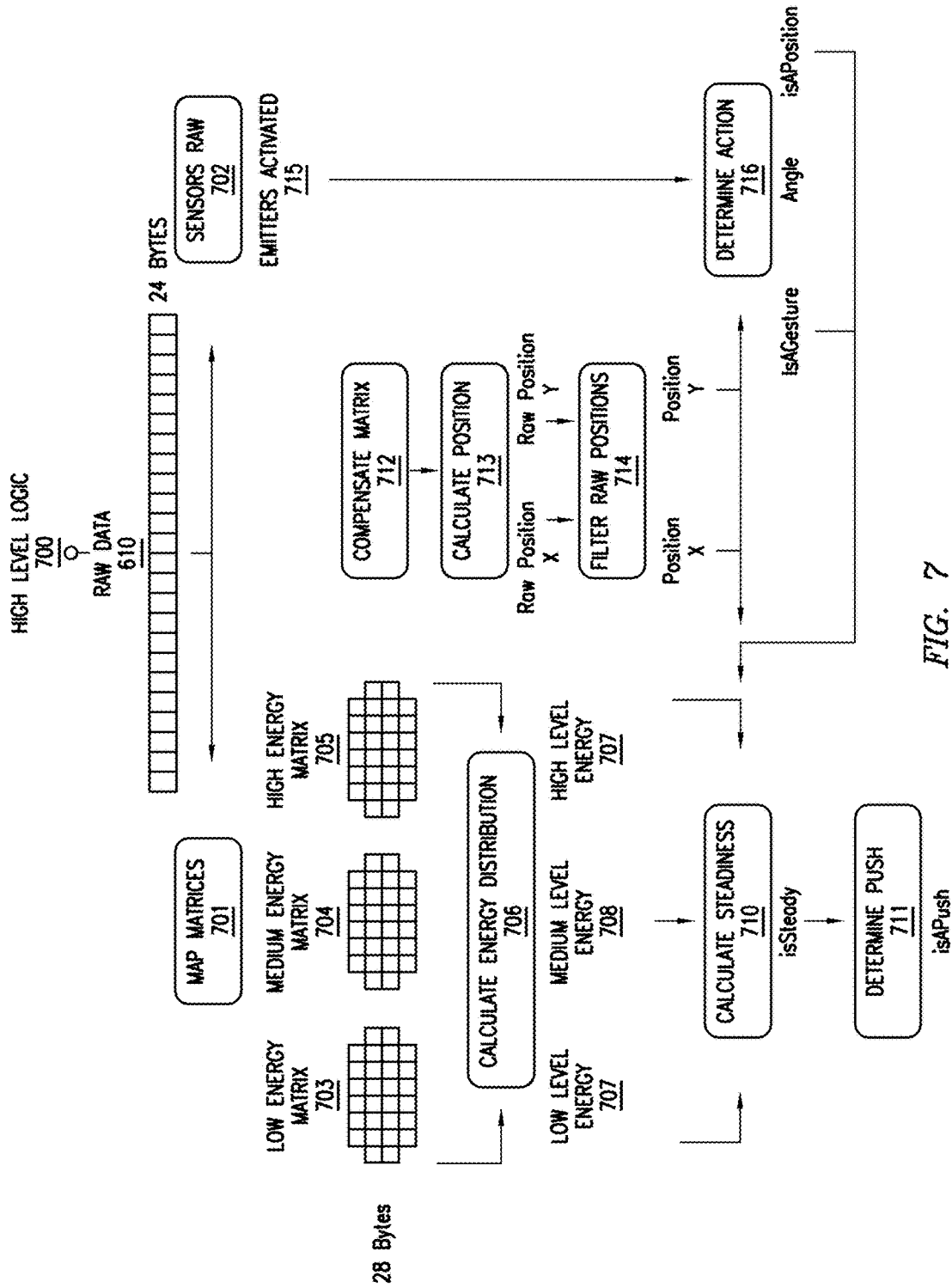
FIG. 7 illustrates an example functional diagram of the operation of a High Level Logic.

FIG. 7 illustrates an example functional diagram of the operation of the High Level Logic 700. In particular embodiments, the High Level Logic 700 may be embedded in a single MCU. For example, the High Level Logic 700 may achieve a processing rate of 1.5 milliseconds per data frame with a 180 MHz 512 KB flash and 128 KB RAM microprocessor. In particular embodiments, the High Level Logic 700 may receive raw data, such as the raw data vector 610, from the Low Level Logic 600. The raw data vector may include a plurality of bytes, each corresponding to the receivers of one sensing module 201 at one power level. As an example and not by way of limitation, the raw data vector 610 corresponding to the example prototype of FIG. 2 may include twenty four bytes if three power levels are used with eight sensing modules. In particular embodiments, the High Level Logic 700 may include a plurality of modules. As an example and not by way of limitation, the High Level Logic 700 illustrated in FIG. 7 may include Map Matrices 701 and Sensors Raw 702. With the module of Map Matrices 701, the High Level Logic 700 may generate a plurality of data matrices corresponding to the plurality of pre-defined power levels respectively, based on the raw data vector 610. The plurality of data matrices may map the total energy received by the sensing modules 201 into a virtual physical space. For example, each matrix 703, 704, and 705 may represent a region of X-Y space in the field of view of the touchless sensing system. As illustrated in FIG. 7, the region of X-Y space is divided into 28 cells (or zones). Each zone corresponds to a set of X-Y coordinates in physical space. While the virtual physical space represented by matrices 703, 704, and 705 is divided into 28 rectangular zones arranged in a particular geometric configuration, this disclosure contemplates dividing an X-Y region of space in the field of view of a touchless sensing system into any suitable number of zones arranged in any suitable geometric shape.

Continuing with the example prototype of FIG. 2, the High Level Logic 700 may generate three data matrices including Low Energy Matrix 703, Medium Energy Matrix 704, and High Energy Matrix 705, corresponding to the power levels of Low Energy, Medium Energy, and High Energy, respectively. Each data matrix may include twenty eight bytes corresponding to twenty eight different zones. In particular embodiments, the number of zones, the location of zones in the virtual physical space, or both, may depend on the number of sensing modules used and the physical configuration of those sensors. Each of these twenty eight zones is a representation of a location of the virtual physical space. Each sensing module 201 may have a fixed physical location in the touchless sensing system 200. As a result, each sensing module 201 may be associated with a particular zone or number of zones. With the module of Sensors Raw 702, the High Level Logic 700 may determine the number of activated emitters 202 corresponding to each of the plurality of pre-defined power levels respectively at step 715. Although FIG. 7 illustrates a particular functional diagram of the operation of the High Level Logic, this disclosure contemplates any suitable functional diagram of the operation of the High Level Logic in any suitable manner.

In particular embodiments, the High Level Logic 700 may determine the position of an object based on a plurality of steps. The object may be hovering within the field of view of the touchless sensing system 200. As an example and not by way of limitation, the plurality of steps may include Compensate Matrix 712, Calculate Position 713 and Filter Raw Positions 714 as illustrated in FIG. 7. In particular embodiments, the High Level Logic 700 may implement Compensate Matrix 712 in the following way. The High Level Logic 700 may first filter the High Energy Matrix 705 to eliminate noisy information from the raw data samples received from the receivers 203. As an example and not by way of limitation, the raw data samples may contain information associated with both a hand and an arm of a person. But the information associated with the arm may bring in erratic and noisy information that may negatively affect the determining of the position and motion of an object (e.g., the hand). Thus, it may be necessary to eliminate the noisy information associated with the arm. Based on the assumption that the arm may always appear from the bottom or from the side of a field of view of the touchless sensing system 200, the High Level Logic 700 may subtract energy from the lower zones of the High Energy Matrix 705 if energy is present in the upper zones of the High Energy Matrix 705. The upper zones of the High Energy Matrix 705 may be normalized and averaged out and the lower zones of the High Energy Matrix 705 may be reduced accordingly. Although this disclosure illustrates particular ways of eliminating noisy information from data samples, this disclosure contemplates any suitable way of eliminating noisy information from any suitable data sample in any suitable manner.

In particular embodiments, the High Level Logic 700 may perform Calculate Position 713 after the High Energy Matrix 705 is compensated. Each of the plurality of energy zones may have an energy and an associated location in the virtual physical space. Therefore, the High Level Logic 700 may weight each point in a set of X-Y coordinates based on the received energy at that point. The weighted points may be noisy. As a result, the High Level Logic 700 may perform Filter Raw Positions 706 by implementing a plurality of filters. As an example and not by way of limitation, the plurality of filters may include two filters, one for the coordinate on the X axis and the other for the coordinate on the Y axis. As another example and not by way of limitation, the plurality of filters may be One Euro filters. One Euro filter is an adaptive low pass filter. A benefit of these filters may include effectively cleaning the raw position of the object, which may further compensate for both slow and fast movement of the object. In particular embodiments, the High Level Logic 700 may take the filtered coordinates as the determined position of the object. Although this disclosure illustrates particular ways of determining positions of particular objects, this disclosure contemplates any suitable way of determining positions of any suitable objects in any suitable manner.

In particular embodiments, the High Level Logic 700 may calculate the energy distribution to estimate the amount of energy received by each zone based on the amount of power of the NIR light perceived by each neighboring sensing module 201 at step 706. The calculation may result in a plurality of energy distributions corresponding to a plurality of pre-defined power levels. As an example and not by way of limitation, three energy distributions including Low Level Energy 707, Medium Level Energy 708, and High Level Energy 709, may be obtained corresponding to the power levels of Low Energy, Medium Energy, and High Energy, respectively. In particular embodiments, the High Level Logic 700 may further calculate the steadiness of an object at step 710 for determining a motion along the Z axis at step 711 based on the energy distributions. As an example and not by way of limitation, the High Level Logic 700 may calculate hand steadiness at step 710 for determining a push action at step 711. For example, object steadiness may be determined by analyzing the temporal change of energy detected in one or more zones of one or more energy matrices. In particular embodiments, the High Level Logic 700 may determine an action on the X-Y plane at step 716 based on the determined number of activated emitters 202 and the determined position of the object. As an example and not by way of limitation, determining an action at step 716 may include recognizing a gesture, determining an angle of the gesture, and tracking a position of the object. Although this disclosure illustrates a particular relationship of energy distribution and steadiness calculation, this disclosure contemplates any suitable relationship of energy distribution and steadiness calculation in any suitable manner.

Figure 8:
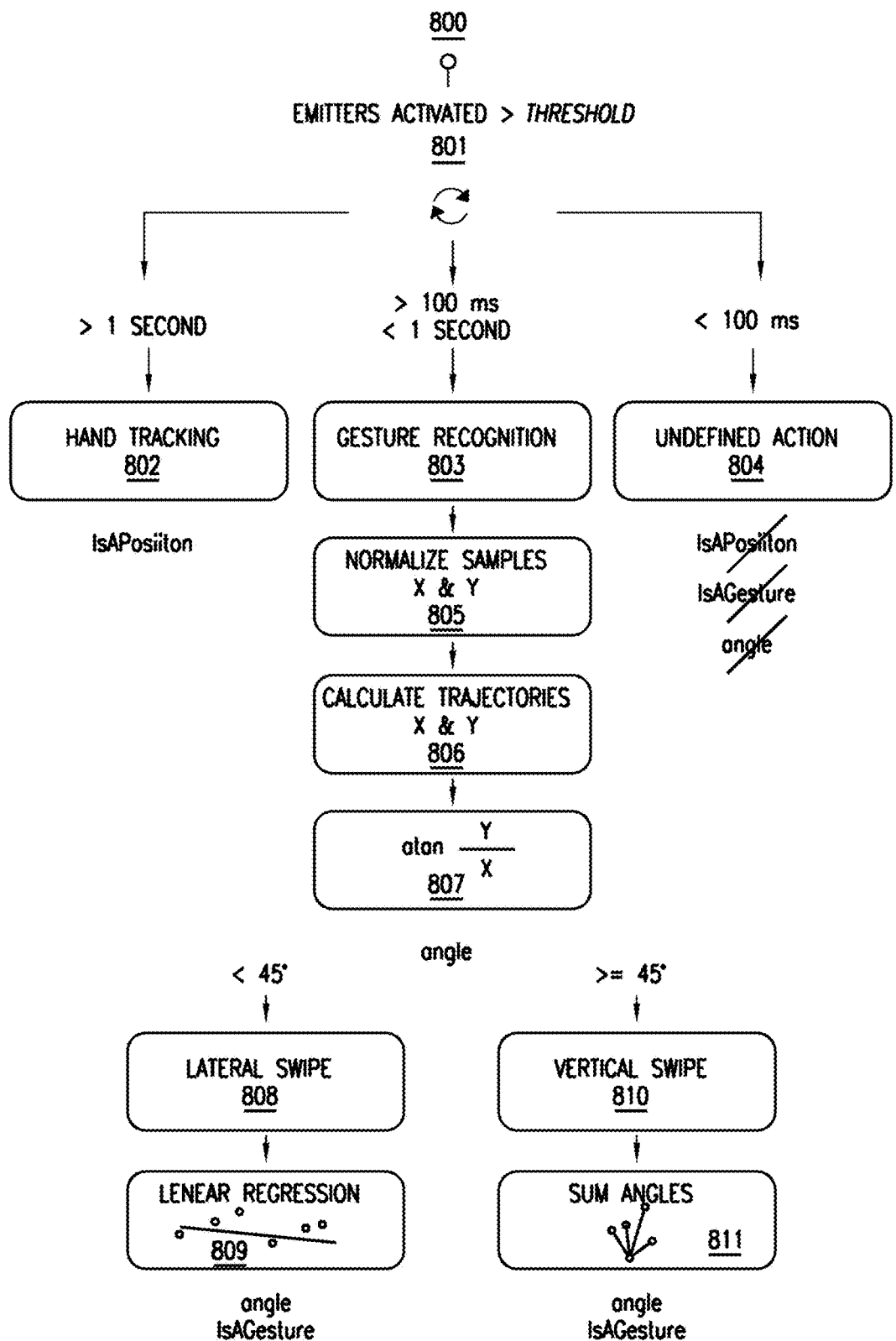
FIG. 8 illustrates an example flow diagram of a High Level Logic determining an action.

FIG. 8 illustrates an example flow diagram of the High Level Logic 700 determining an action. As an example and not by way of limitation, determining an action as illustrated in FIG. 8 may include hand tracking 802, gesture recognition 803 and categorizing as undefined action 804. In particular embodiments, the High Level Logic 700 may first evaluate if the number of activated emitters 202 is larger than a threshold number at step 801. After this criteria is met, the High Level Logic 700 may proceed to subsequent steps. In particular embodiments, the High Level Logic 700 may track the motion of the object (e.g., hand tracking) based on the generated data matrices (e.g., Low Energy Matrix 703, Medium Energy Matrix 704, and High Energy Matrix 705) and the determined number of activated emitters 202, if more than a threshold number of emitters 202 are activated for more than a threshold amount of time. As an example and not by way of limitation, the threshold amount of time may be one second. In particular embodiments, the High Level Logic 700 may identify the motion of the object (e.g., gesture recognition) based on the generated data matrices (e.g., Low Energy Matrix 703, Medium Energy Matrix 704, and High Energy Matrix 705) and the determined number of activated emitters 202 if more than a threshold number of emitters 202 are activated for a duration within a pre-defined range of time. As an example and not by way of limitation, the pre-defined range of time may be more than one hundred milliseconds and less than one second. In particular embodiments, the High Level Logic 700 may categorize the motion of the object as an undefined action if more than a threshold number of emitters 202 are activated for less than a threshold amount of time. As an example and not by way of limitation, the threshold time may be one hundred milliseconds. In particular embodiments, the High Level Logic 700 may perform motion identification (e.g. gesture recognition) in the following way. The High Level Logic 700 may first normalize all the data samples with respect to the X and Y axes at step 805. The High Level Logic 700 may then calculate the trajectory along the X axis and the trajectory along the Y axis at step 806. The High Level Logic 700 may then calculate an angle that indicates the relationship between the two coordinates using arctangent at step 807. As an example and not by way of limitation, if the angle is smaller than 45° the High Level Logic 700 may identify the motion as a lateral swipe 808; otherwise, the High Level Logic 700 may identify the motion as a vertical swipe 810. If the motion is a lateral swipe 808, the High Level Logic 700 may implement a linear regression at step 809 to find the equation of the line that best fits all the data points. As a result, the outliers may be corrected for and a more accurate gesture recognition 803 may be achieved. If the motion is a vertical swipe 810, the High Level Logic 700 may sum up all the angles between the first point where the first sample was collected and all the following points at step 811. The High Level Logic 700 may further calculate the average value of the summed angle as the final angle of the gesture. Thus, as described herein, the High Level Logic 700 may determine a particular gesture by analyzing the temporal change in energy of one or more energy zones of the energy matrices described with respect to FIG. 7. Although this disclosure illustrates a particular flow diagram of the High Level Logic determining an action, this disclosure contemplates any suitable flow diagram of the High Level Logic determining any suitable action in any suitable manner.

In particular embodiments, the plurality of pre-defined power levels may correspond to a plurality of pre-defined depths with respect to the touchless sensing system 200. As a result, the High Level Logic 700 may identify a motion of an object along the Z axis (e.g., a push action of a user) based on the variability of the energy received by the receivers 203. As an example and not by way of limitation, the emitted NIR light at the three power levels (i.e., Low Energy, Medium Energy, and High Energy) may correspond to three maximum sensing distances, e.g., 10 cm, 20 cm, and 50 cm. The distances may change based on the surface of the object that reflects the NIR light. Thus, in particular embodiments, the distance associated with a particular energy level may depend on the outcome of the initialization process described above.

In some embodiments, the correlation between the power of emitted NIR light and the sensing distance may be useful for determining an action along the Z axis. In some embodiments, for the following reasons, such correlation may require additional processing or steps to determine the action. First, a hand crossing different sensing distances corresponding to different energy levels may not necessarily indicate that a user is performing an action along the Z axis. Instead, the user may be just moving his/her hand across the touchless sensing system 200. Second, the user may perform a push action without crossing different sensing distances corresponding to different energy levels. Third, the pattern of a push action along the Z axis crossing different sensing distances corresponding to different energy levels may be similar to that of a motion along the X and Y axes. Last, the data samples received at the receivers 203 with respect to the Z axis may be very noisy. At least in part to overcome the aforementioned issues, the High Level Logic 700 may determine a push action based on a plurality of steps including Calculate Energy Distribution 706, Calculate Steadiness 710, and Determine Push 711.

Figure 9:
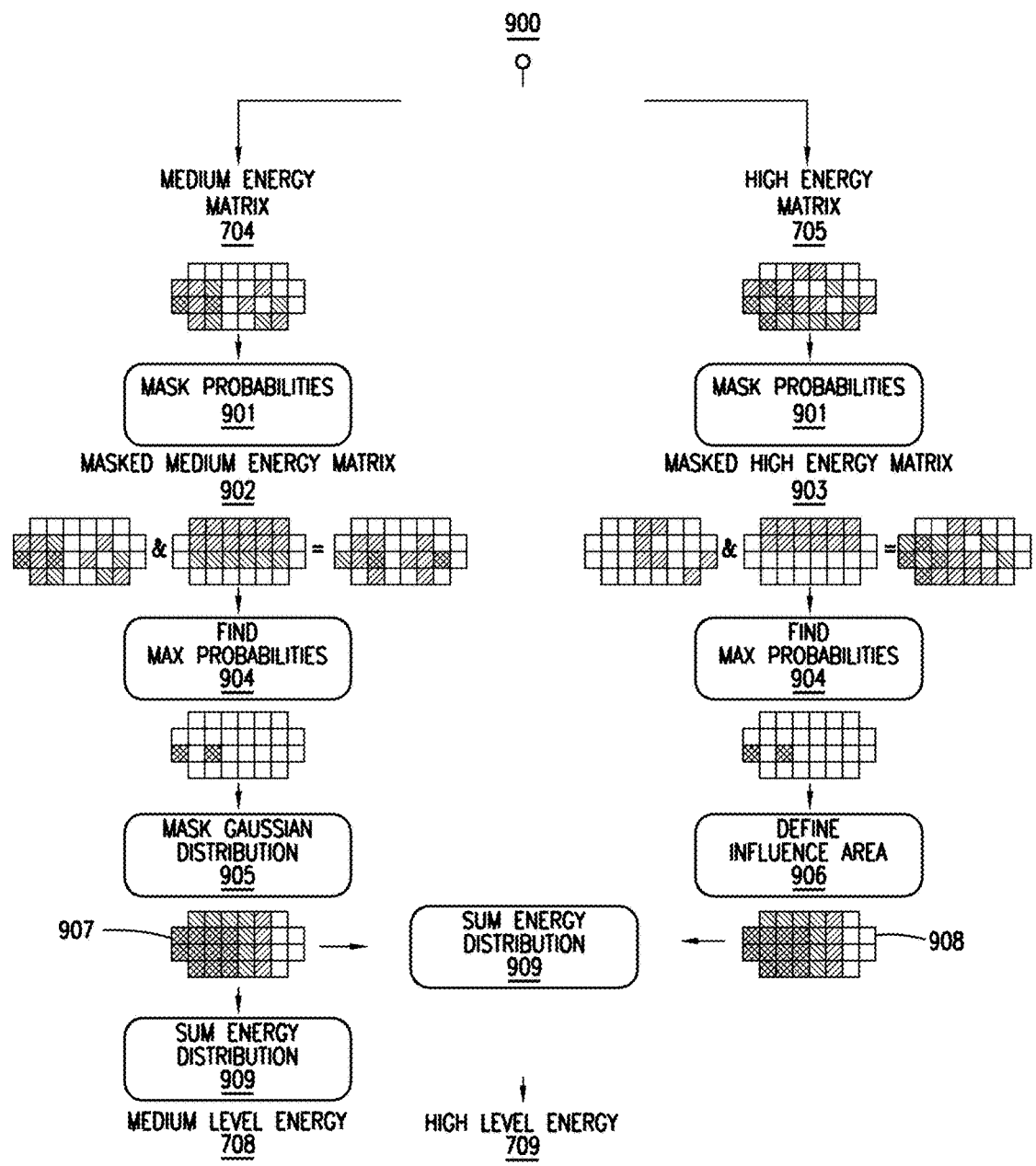
FIG. 9 illustrates an example flow diagram of a High Level Logic calculating an energy distribution.

FIG. 9 illustrates an example flow diagram of the High Level Logic 700 calculating the energy distribution. In particular embodiments, the High Level Logic 700 may first mask the Medium Energy Matrix 704 and High Energy Matrix 705 using Mask Probabilities 901, respectively. The Mask Probabilities 901 may contain a plurality of probabilities corresponding to each of the plurality of zones, respectively. As an example and not by way of limitation, the probability may indicate how likely the energy detected at a corresponding zone is reflected from a hand instead of an arm. In particular embodiments, the High Level Logic 700 may then process the Masked Medium Energy Matrix 902 and the Masked High Energy Matrix 903 separately. With respect to the Masked High Energy Matrix 903, the High Level Logic 700 may select the four areas with the highest energy at step 904 and draw an area around these four areas. The High Level Logic 700 may then generate an influence-area defined high energy distribution matrix 908 for the Masked High Energy Matrix 903 after step 906. As a result, all the high energy may be concentrated in a specific area. In particular embodiments, the High Level Logic 700 may additionally use the Masked Medium Energy Matrix 902 to correct and soothe the influence-area defined high energy distribution matrix 908. With respect to the Masked Medium Energy Matrix 902, the High Level Logic 700 may first select the two areas with the highest probabilities at step 904. The High Level Logic 700 may then mask the Masked Medium Energy Matrix 902 with two highest probabilities using Gaussian distribution at step 905. A medium energy distribution matrix 907 for the Masked Medium Energy Matrix 902 may be generated accordingly and the two highest probabilities may indicate the peaks of two Gaussian distributions. In particular embodiments, the High Level Logic 700 may then create a cluster of energy with a distinct energy peak and an area of influence appropriately distributed based on matrix 907 and matrix 908. The created cluster of energy may also have low noise, low latency, and low drift. The created cluster of energy may additionally soften the energy peaks caused by hand movements in all axes. In particular embodiments, the High Level Logic 700 may further sum up the total energy of the matrix 908 and the total energy of the matrix 907 at step 909, which may result in the High Level Energy 709. In particular embodiments, the High Level Logic 700 may also sum up the total energy of the matrix 907 at step 909, which may result in the Medium Level Energy 708. Although this disclosure illustrates a particular flow diagram of the High Level Logic calculating the energy distribution, this disclosure contemplates any suitable flow diagram of the High Level Logic calculating any suitable energy distribution in any suitable manner.

Figure 10:
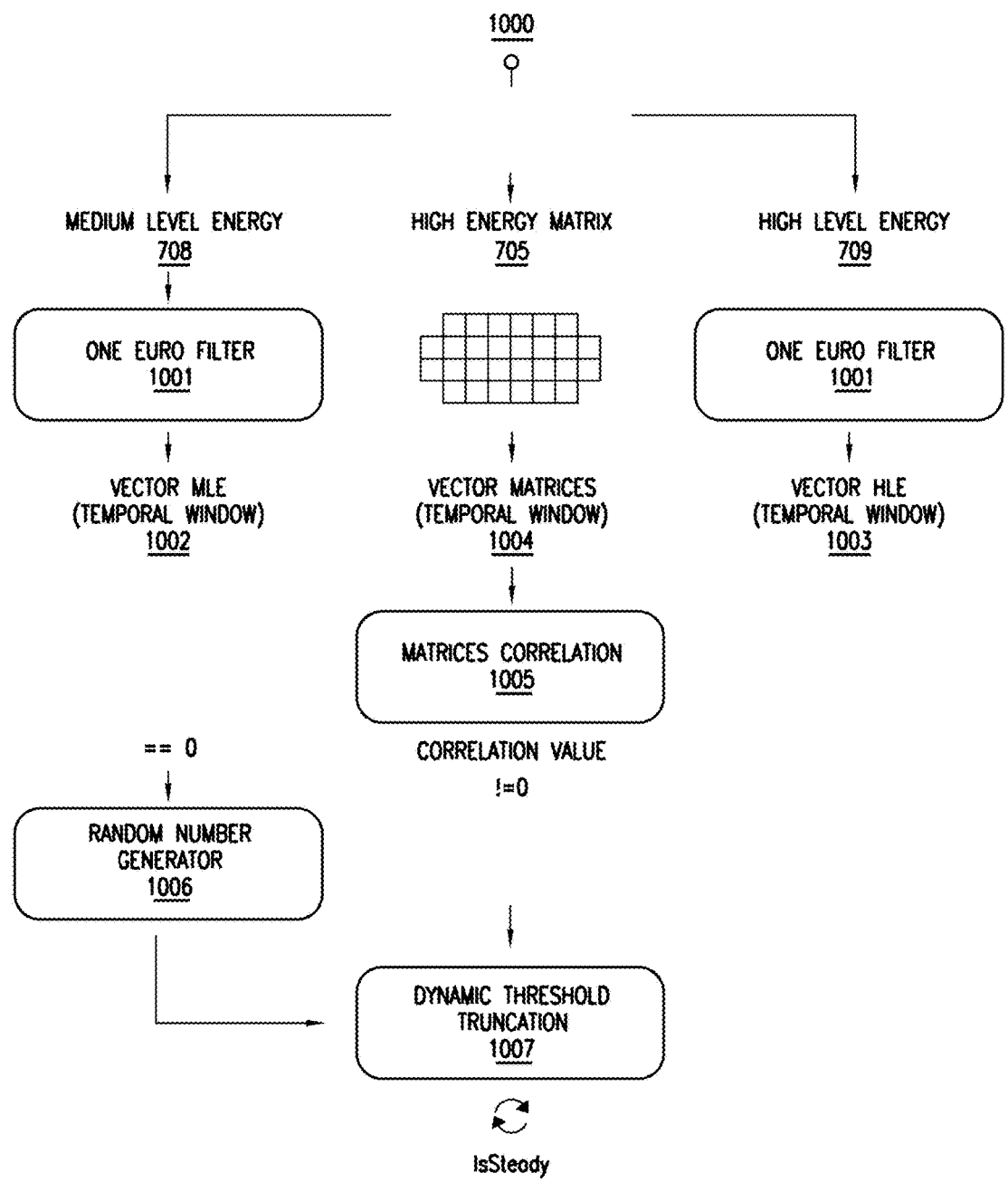
FIG. 10 illustrates an example flow diagram of a High Level Logic calculating a steadiness of an object.

FIG. 10 illustrates an example flow diagram of the High Level Logic 700 calculating the steadiness of an object. As an example and not by way of limitation, the High Level Logic 700 may detect if a user has his/her hand steady in a very short period of time. In particular embodiments, the High Level Logic 700 may filter the Medium Level Energy 708 using, e.g., a One Euro Filter 1001. The High Level Logic 700 may further vectorize the filtered Medium Level Energy, which may result in a Vector MLE (Medium Level Energy) 1002. In particular embodiments, the High Level Logic 700 may filter the High Level Energy 709 using a One Euro Filter 1001. The High Level Logic 700 may further vectorize the filtered High Level Energy, which may result in a Vector HLE (High Level Energy) 1003. The High Level Logic 700 may store Vector MLE 1002 and Vector HLE 1003 in two different lists. In particular embodiments, the High Level Logic 700 may also vectorize the High Energy Matrix 705, which may result in Vector Matrices 1004. The High Level Logic 700 may store Vector Matrices 1004 in another list. In particular embodiments, the High Level Logic 700 may calculate the correlation of all the vectorized matrices including Vector MLE 1002, Vector HLE 1003, and Vector Matrices 1004 at step 1005. The calculated correlation value may indicate the level of similarity among these vectorized matrices. In particular embodiments, the High Level Logic 700 may use the correlation value as the input of a Dynamic Threshold Truncation algorithm 1007 if the correlation value is non-zero. In particular embodiments, the High Level Logic 700 may use a random number generated by a Random Number Generator as the input of the Dynamic Threshold Truncation algorithm 1007 if the correlation value is zero. In particular embodiments, the Dynamic Threshold Truncation algorithm 1007 may generate an index of variability indicating how much the information with respect to the motion of the object is changing based on standard deviation of the data corresponding to the motion of the object. In particular embodiments, the Dynamic Threshold Truncation algorithm 1007 may further determine that an object is steady if the index of variability is lower than a threshold value for a threshold period of time. Although this disclosure illustrates a particular flow diagram of the High Level Logic calculating the steadiness of an object, this disclosure contemplates any suitable flow diagram of the High Level Logic calculating any suitable steadiness of any suitable object in any suitable manner.

In particular embodiments, the motion identification along Z axis may be triggered if an object is determined to be steady by the Dynamic Threshold Truncation algorithm 1007. As an example and not by way of limitation, Determine Push 711 may be triggered if a user's hand is determined to be steady. In particular embodiments, the High Level Logic 700 may then analyze the energy levels and calculate the derivative across the data samples of each energy level to find the tendency of the data samples. In particular embodiments, the High Level Logic 700 may further weight the tendencies of the Medium Level Energy 708 and the High Level Energy 709 accordingly to get a unique value. If the unique value is negative, the High Level Logic 700 may determine that the action is a push. Although this disclosure illustrates a particular way of determining a push action, this disclosure contemplates any suitable way of determining a push action in any suitable manner.

In particular embodiments, the touchless sensing system 200 may create a 3D interaction space of approximately fifty centimeters in radius in front of the touchless sensing system 200. As an example and not by way of limitation, the touchless sensing system 200 may determine the position of a hand that enters the sensing space and identify hand gestures performed in the field of view. The hand gestures may include a lateral swipe, vertical swipe, and push. The touchless sensing system 200 may additionally identify other hand gestures by modeling the 3D interaction space in different ways, changing the physical distribution of sensing modules 201, changing the number of sensing modules 201, and/or changing the illumination patterns. An advantage of the touchless sensing system 200 may include requiring little sensory information, low computational load and low cost. As a result, the touchless sensing system 200 may be integrated with a plurality of devices and systems for a plurality of applications. As an example and not by way of limitation, the touchless sensing system 200 may be integrated with wearable devices including a smart watch, virtual reality headset, fitness wristband, headphone, smart glove, etc. As another example and not by way of limitation, the touchless sensing system 100 may be integrated with portable devices including an e-reader, tablet, smartphone, digital camera, sport camera, laptop, music system, portable gaming device, etc. As another example and not by way of limitation, the touchless sensing system 200 may be integrated with home appliances and devices including a smart TV, computer, remote controller for TV, controller for gaming system, DJ mixer, keyboard, etc. As another example and not by way of limitation, since in-the-air interaction is highly hygienic the touchless sensing system 200 may be integrated with medical devices and/or in sterile environments, such as in association with a monitor, bed, stand for medicine supply, dialysis machine, lab equipment, etc. As another example and not by way of limitation, since it provides intuitive and seamless interactions the touchless sensing system 200 may be integrated into cars for controlling a car entertaining system, air conditioner, etc. As another example and not by way of limitation, because of hygienic and intuitive interactions the touchless sensing system 200 may be integrated with public space systems including a public display, elevator, ATM machine, shop window, ticket machine, etc. As another example and not by way of limitation, since in-the-air interactions leave no physical traces the touchless sensing system 200 may be integrated with devices that can potentially compromise users' security and privacy, including an ATM machine, combination lock, safe, public keyboard, etc. Although this disclosure illustrates particular applications of the touchless sensing system, this disclosure contemplates any suitable applications of the touchless sensing system in any suitable manner.

Figure 11:
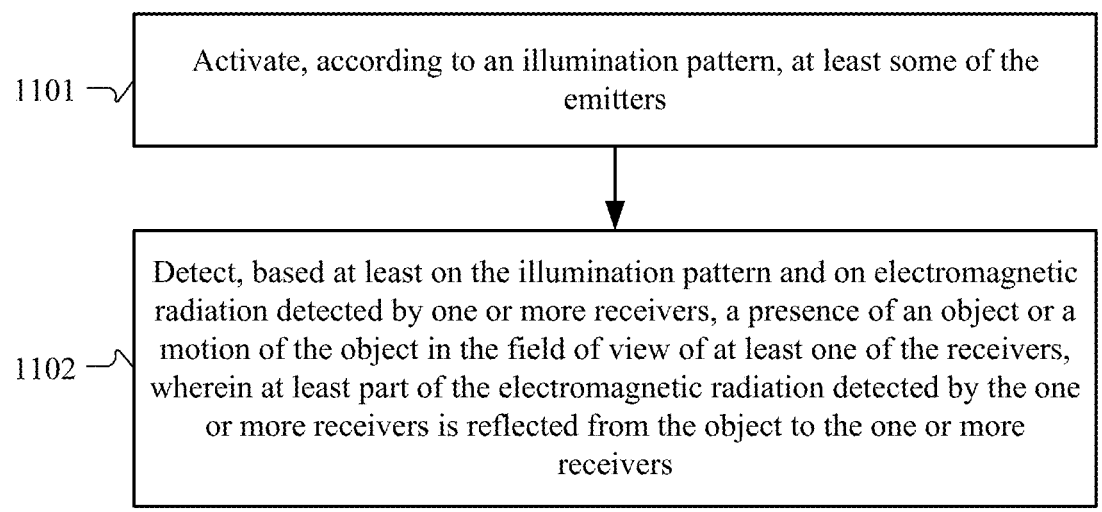
FIG. 11 illustrates an example method for sensing an object based on electromagnetic radiation.

FIG. 11 illustrates an example method 1100 for sensing an object based on electromagnetic radiation. At step 1101, at least some of the emitters 202 may be activated according to an illumination pattern. For example, an illumination pattern may be generated based on the power level of Low Energy. The method may activate at least some of the emitters 202 based on this particular illumination pattern by instructing these emitters 202 to emit electromagnetic radiation at the power level of Low Energy. At step 1102, the method may detect, based at least on the illumination pattern and on electromagnetic radiation detected by one or more receivers 203, a presence of an object or a motion of the object in the field of view of at least one of the receivers 203, wherein at least part of the electromagnetic radiation detected by the one or more receivers 203 is reflected from the object to the one or more receivers 203. For example, after the emitters 202 emit electromagnetic radiation at the power level of Low Energy, the electromagnetic radiation may be reflected back by an object if the object is in the field of view. The reflected electromagnetic radiation may reach some receivers 203 but not reach other receivers 203, which means some receivers 203 may get data samples whereas other receivers 203 may not. The method may then detect the presence of the object or the motion of the object based on the data samples received at some of the receivers 203.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for sensing an object based on electromagnetic radiation, including the particular steps of the method of FIG. 11, this disclosure contemplates any suitable method for sensing an object based on electromagnetic radiation, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
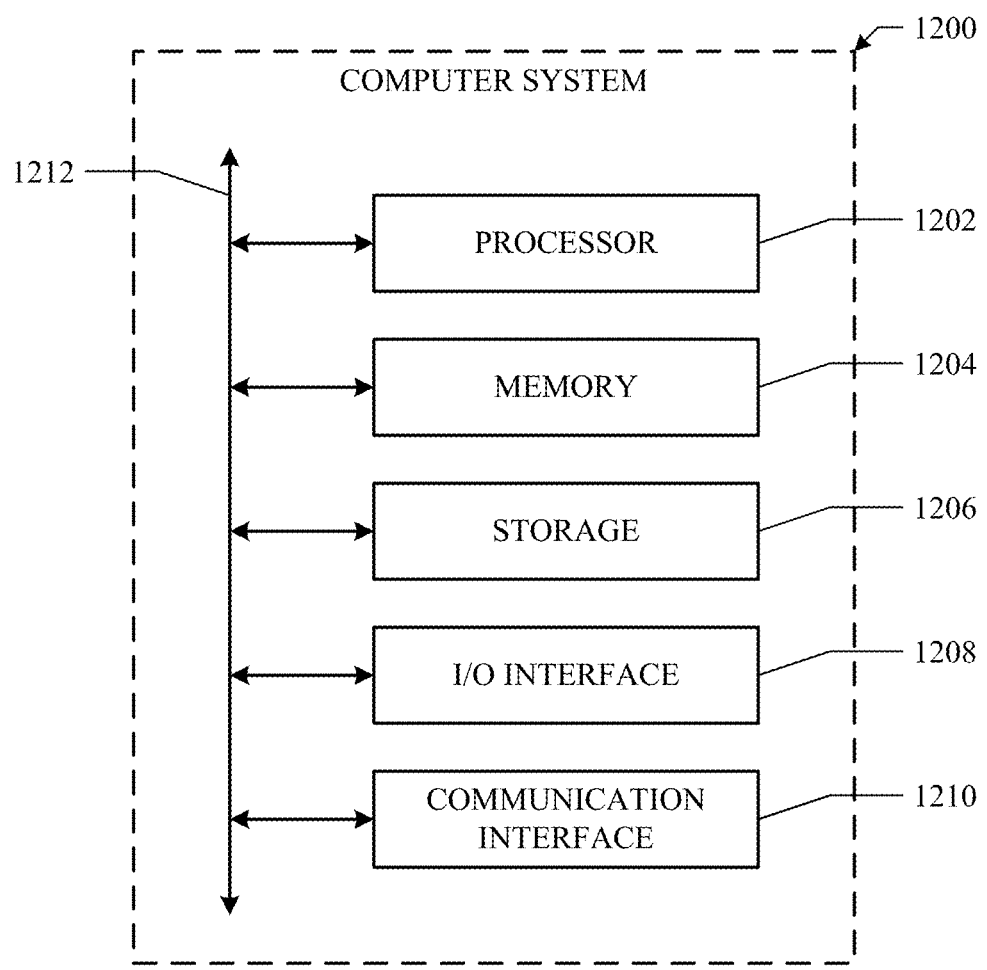
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus comprising:
   a plurality of emitters of electromagnetic radiation, wherein each emitter corresponds to a different field of view;
   a plurality of receivers of electromagnetic radiation, wherein each receiver corresponds to a different field of view; and
   one or more non-transitory storage media embodying instructions and one or more processors operable to execute the instructions to:
   activate at a first power level at least some of the emitters;
   activate at a second power level at least some of the emitters, wherein the second power level is greater than the first power level; and
   detect, based at least on electromagnetic radiation detected by one or more receivers as a result of emission at the first power level and based on electromagnetic radiation detected by one or more receivers as a result of emission at the second power level, a presence of an object or a motion of the object in the field of view of at least one of the receivers, wherein at least part of the electromagnetic radiation detected by the one or more receivers is reflected from the object to the one or more receivers.

2. The apparatus of claim 1, wherein the one or more processors are further configured to execute the instructions to determine a position of the object.

3. The apparatus of claim 1, wherein the one or more processors are further configured to execute the instructions to track the motion of the object.

4. The apparatus of claim 1, wherein the one or more processors are further configured to execute the instructions to identify the motion of the object.

5. The apparatus of claim 1, wherein the electromagnetic radiation comprises near infrared light.

6. The apparatus of claim 1, wherein each emitter comprises one or more light-emitting diodes (LEDs).

7. The apparatus of claim 1, wherein each receiver comprises one or more photodiodes.

8. The apparatus of claim 1, wherein the one or more processors are further operable to execute the instructions to activate the plurality of emitters according to one or more illumination patterns.

9. The apparatus of claim 1, wherein the processors are further operable to execute the instructions to activate at a third power level at least some of the emitters, wherein the third power level is greater than the second power level, and the presence or motion of the object is further based at least on electromagnetic radiation detected by one or more receivers as a result of emission at the third power level.

10. The apparatus of claim 1, wherein the first and second power levels correspond to two different pre-defined depths with respect to the apparatus.

11. The apparatus of claim 1, further comprising a plurality of sensing modules, wherein each of the plurality of sensing module comprises:

one or more emitters of the plurality of emitters of electromagnetic radiation, wherein each emitter in a sensing module has the same field of view;

one or more receivers of the plurality of receivers of electromagnetic radiation; and one or more microcontrollers.

12. The apparatus of claim 11, wherein the one or more microcontrollers are configured to:

communicate with the one or more processors;

modulate the electromagnetic radiation emitted by the one or more emitters of the corresponding sensing module;

regulate emission power of the one or more emitters of the corresponding sensing module; and process the electromagnetic radiation received by the one or more receivers of the corresponding sensing module.

13. The apparatus of claim 11, wherein, for each of the first power level and the second power level, the one or more processors are further configured to:

sequentially activate the one or more emitters of each of the plurality of sensing modules to emit electromagnetic radiation at the respective power level such that the emitters of only one sensing module are active at a time; and after any of the one or more emitters of any sensing module are activated:

receive, at one or more of the plurality of receivers, reflected electromagnetic radiation corresponding to the respective power level each time after the one or more emitters are activated for each of the plurality of sensing modules, wherein the one or more of the plurality of receivers are selected based on whether the reflected electromagnetic radiation reaches the one or more of the plurality of receivers.

14. The apparatus of claim 13, wherein the one or more processors are further configured to:

generate a data vector comprising a plurality of bytes, wherein each of the plurality of bytes is based on received electromagnetic radiation corresponding to each of the first and second power levels with respect to each of the plurality sensing modules;

generate a plurality of data matrices corresponding to the first and second power levels, respectively, based on the generated data vector; and determine a number of activated emitters corresponding to each of the first and second power levels, respectively.

15. The apparatus of claim 14, wherein the one or more processors are further configured to execute the instructions to determine a position of the object based on the generated data matrices and the determined number of activated emitters.

16. The apparatus of claim 14, wherein the one or more processors are further configured to execute the instructions to track the motion of the object based on the generated data matrices and the determined number of activated emitters, if more than a threshold number of emitters are activated for more than a threshold amount of time.

17. The apparatus of claim 14, wherein the one or more processors are further configured to execute the instructions to identify the motion of the object based on the generated data matrices and the determined number of activated emitters, if more than a threshold number of emitters are activated for a duration within a pre-defined range of time.

18. One or more non-transitory computer-readable storage media embodying instructions that when executed by one or more processors cause the one or more processors to perform operations comprising:

activating at a first power level at least some of a plurality of emitters of electromagnetic radiation, wherein each emitter corresponds to a different field of view;

activate at a second power level at least some of the emitters, wherein the second power level is greater than the first power level; and detecting, based at least on electromagnetic radiation detected by one or more receivers as a result of emission at the first power level and based on electromagnetic radiation detected by one or more receivers as a result of emission at the second power level, a presence of an object or a motion of the object in a field of view of the one or more receivers, wherein each of the receivers corresponds to a different field of view.

19. The media of claim 18, wherein the operations further comprise activating the plurality of emitters according to one or more illumination patterns.

20. A method comprising:

activating at a first power level at least some of a plurality of emitters of electromagnetic radiation, wherein each emitter corresponds to a different field of view;

activating at a second power level at least some of the emitters, wherein the second power level is greater than the first power level; and detecting, based at least on electromagnetic radiation detected by one or more receivers as a result of emission at the first power level and based on electromagnetic radiation detected by one or more receivers as a result of emission at the second power level, a presence of an object or a motion of the object in a field of view of the one or more receivers, wherein each of the receivers corresponds to a different field of view.

* * * * *